TIMING AND HOLDING APPARATUS

Filed Oct. 22, 1954 2 Sheets-Sheet 1

INVENTOR.
JOSEPH J. ZIMMERMANN
BY Andrus + Sceales
Attorneys

*INVENTOR.*
JOSEPH J. ZIMMERMANN
*BY* Andrus + Sceales
Attorneys

United States Patent Office 2,769,860

Patented Nov. 6, 1956

2,769,860

TIMING AND HOLDING APPARATUS

Joseph J. Zimmermann, Milwaukee, Wis., assignor to The Electronic Secretary, Inc., Milwaukee, Wis., a corporation of Wisconsin Application October 22, 1954, Serial No. 463,977

10 Claims. (Cl. 179—6)

This invention relates to an automatic timing and holding apparatus.

In an automatic holding system, a driven member is at times to be held in position after a predetermined movement. When the driving means is an alternating current motor, a brake or cam arrangement is generally employed to maintain the driven member at the predetermined position. If a brake is employed, the motor is normally de-energized or disengaged from the driven member while the latter is in the predetermined position.

Further, the alternating magnetic field surrounding the motor is undesirable at certain instances. If the motor is de-energized, a separate holding means is employed.

For example, one method of connecting a telephone answering apparatus in circuit with a telephone circuit is an induction coil or coils which are disposed adjacent the telephone instrument. The induction coil or coils are utilized to pick up either or both of the incoming ringing current and the incoming message. To answer an incoming call, the telephone talking circuit is generally completed by mechanically moving the talking circuit switches in the telephone instrument. In the French-type telephone a lever directly moves the talking circuit buttons to a closed position or indirectly by raising the handset off the base of the telephone instrument. For the typical wall-type telephone having a physically separated receiver and transmitter, the receiver hook is actuated by a lever to simulate the answering of the telephone.

Movement of the lever for simulating the answering of the telephone is normally effected by a solenoid or a motor-cam arrangement.

If a solenoid is employed, the lever movement is with a snap action which, although technically satisfactory, has not been found to be practically acceptable as there is the possibility of the handset bounding off the base and consequently the telephone talking circuit remaining closed after a cycle of the telephone answering apparatus. Means for retarding the lever movement are rather complicated and therefore not entirely satisfactory.

If a motor-cam arrangement is employed, the motor is generally energized from an alternating current source and sets up a field of A. C. magnetic flux which is picked up by the induction coil and distorts the incoming message. Although it is possible to sufficiently remove the motor from the telephone to alleviate this problem, the lever arrangement is then rather complicated and unwieldy and therefore impractical.

According to the present invention, the talking circuit of the telephone associated with the telephone answering apparatus is closed by operation of an alternating current motor having a magnetic clutch which is energized by the field winding of the motor. The motor drives a lever which actuates the switches to close the transmitting and receiving circuit of the telephone. After the talking circuit is closed, the field winding of the motor is automatically disconnected from the alternating current and connected to a direct current source which stops the operation of the motor and at the same time holds in the clutch. This maintains the talking circuit in closed condition and eliminates the field of distortion originating flux. In ths manner, it is permissible to dispose the motor lifter near the telephone and avoid complicated and cumbersome cam and lever arrangements. At the completion of a cycle of operation of the telephone answering device, the direct current is automatically disconnected from the lifter motor and the switches return to normal position with the circuit of the telephone in open position.

The present invention provides a novel apparatus for quickly stopping a motor driven member at a predetermined position and for holding the motor driven member in that position without an undesirable surrounding alternating magnetic field.

The drawings furnished herewith illustrate the best mode, presently contemplated, for carrying out the invention as hereinafter described.

Figure 1:
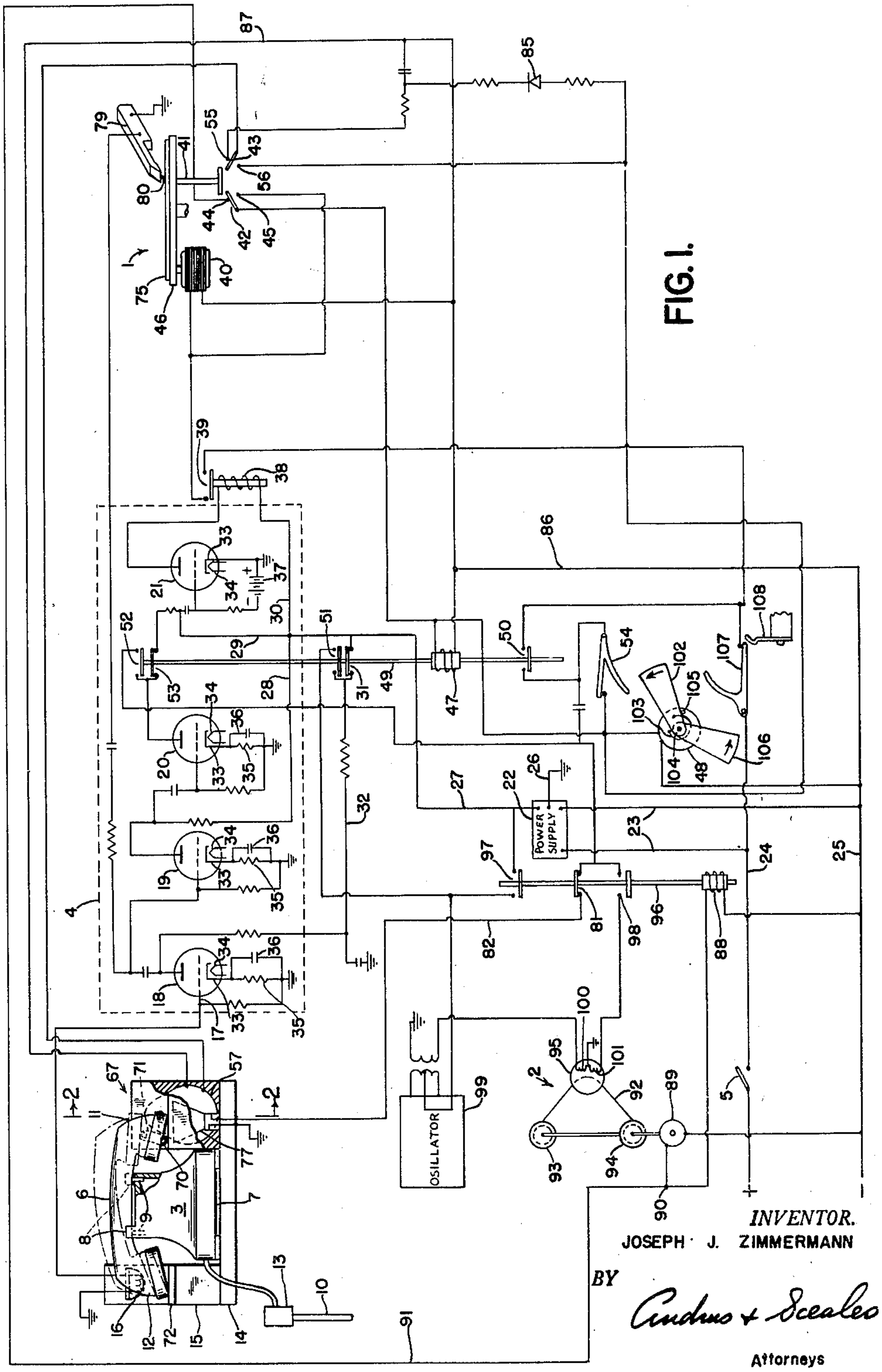
Figure 1 is a schematic diagram of a telephone answering device having a non-distorting lifter motor.

Referring to Figure 1, the illustrated embodiment of the invention comprises generally a phonograph 1 and a wire recorder 2 operatively associated with a telephone 3 to automatically answer incoming calls. An amplifier 4 is employed to increase the power of received and transmitted signals; a portion of the amplifier being employed for both signals. A lifter is disposed adjacent the telephone 3 to effect a closing of the telephone talking circuit and thereby allowing the transmission and receiving of messages over the telephone in response to an incoming call, as subsequently described. To connect the apparatus to a source of power, a manual master switch 5 is employed.

Figure 6:
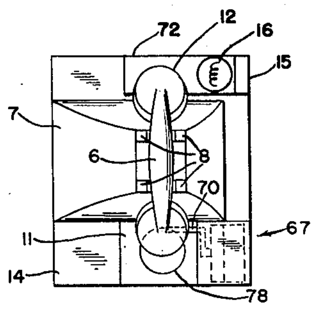
Fig. 6 is a plan view of the telephone.

Referring to Figs. 1 and 6, the telephone 3 is shown for purposes of illustration as a standard desk variety having a handset 6 resting on a base 7. The handset 6 rests on the base 7 between two pair of upwardly extending ears 8 to prevent the handset 6 from slipping off the base 7. Disposed between each pair of ears 8 there is a vertically movable button 9 which operates the telephone switching mechanism in such a manner that with the handset 6 resting on the base and depressing the buttons 9 the telephone 3 is disconnected from the telephone line circuit 10, and when the handset 6 is raised from the base 7, the telephone 3 is connected with the telephone line circuit 10. A conventional ringer, not shown, is housed within the base 7 of the telephone 3. The handset 6 has the conventional transmitting end 11 and receiving end 12. The telephone 3 is connected in the telephone line circuit 10 by the line block 13, in the conventional manner.

In accordance with the illustrated embodiment of the present invention, the telephone base 7 rests on a support plate 14 with a bracket member 15 extending upwardly and supporting an induction coil 16 rearwardly of and adjacent to the receiving end 12 of the handset 6.

The induction coil 16 serves the dual function of magnetically receiving an incoming ringing signal to initiate operation of the apparatus and magnetically receiving an incoming message to record the same, as hereinafter described.

An incoming signal is inductively established in the induction coil 16 and therefrom is placed on the grid 17 of the first tube 18 of the amplifier 4.

For purposes of illustration, the amplifier 4 comprises the four electronic tubes 18, 19, 20, and 21 respectively, all of which are employed to amplify the incoming ringing signals.

The electronic tubes are connected to a power supply 22 for insertion of a B+ voltage in the plate circuit of each tube. The power supply 22 is of any conventional variety adapted to convert the standard 110-volt alternating current to a suitable direct current. The power supply 22 is therefore shown in block form having input lines 23 connected across 110-volt lines 24 and 25. The output of the power supply is inserted in the plate circuits of the electronic tubes via the grounded line 26 and live line 27 leading from the power supply to the plate circuits of tubes 19, 20, and 21 via the conductors 28, 29, and 30, respectively. The live line 27 is also connected in the plate circuit of tube 18 via normally closed relay contacts 31 and conductor 32.

Each cathode 33 of the various electronic tubes has a separate heating element 34 which is connected to a suitable voltage, not shown, for heating the respective cathodes.

The grid-bias voltage of tubes 18, 19 and 20 is fixed by the conventional bias resistor 35 and capacitor 36. The grid-bias voltage of tube 21 is fixed by a battery 37 or other suitable source of direct current.

The incoming ringing signal sets up a magnetic field which induces a voltage in the induction coil 16. The induced voltage is applied, as previously noted, to the grid 17 of tube 18. With a B+ voltage connected to the plate circuits of the various tubes, as previously described, the induced voltage in coil 16 is successively amplified by each of the tubes 18, 19, 20 and 21 which have their respective plate circuits connected to the succeeding tubes in a conventional manner such that tube 18 is the input tube and tube 21 is the output tube of a four stage amplifier.

A trigger relay coil 38 is connected in the plate circuit of tube 21 and operates to close a set of normally open contacts 39 in response to current flow in the plate circuit resulting from an incoming signal.

The contacts 39, in series with a motor 40 of phonograph 1, are connected across the 110-volt lines 24 and 25 with a consequent energization of the motor 40 when the contacts 39 close.

The phonograph 1, driven by motor 40, has an automatic turntable mechanism as more fully described in U. S. Patent No. 2,394,539, dated February 12, 1946. A retractable pin 41 which constitutes part of a clutch device described in the patent referred to is employed to actuate two low-pressure switch blades 42 and 43.

A contact 44 is normally engaged by switch blade 42 and a contact 45 is normally disengaged from switch blade 42. As the motor 40 drives a turntable 46 of the phonograph 1, the retractable pin 41 is depressed and the switch blade 42 disengages contact 44 and engages contact 45.

The engagement of switch blade 42 and contact 45, in cooperation with contacts 39, connects a latching relay coil 47 and a safety-timer motor 48 in parallel across the 110-volt lines 24 and 25. The circuits for the latching coil 47 and motor 48 are traced as follows: starting with the supplyline 24, to contacts 39, contact 45, switch blade 42 which is closed by the depression of pin 41, and then either coil 47 or safety-timer motor 48, to the supply line 25.

An armature 49 moves in response to energization of relay coil 47 to close contacts 50, 51 and 52 and simultaneously therewith to open contacts 31 and 53.

The opening of contacts 31 opens the B+ supply to the tube 18 and makes the tube inoperative with a consequent prevention of further energization of triggering relay coil 38 as a result of incoming ringing signals and thereby prevents closing of the triggering contacts 39.

The closing of contacts 50 provides a bypass across the contacts 39 so that energization of the phonograph motor 40, latching coil 47 and safety-timer motor 48 is independent of the contacts 39.

The circuit of the latching coil 47 is now traced as follows: starting with the supply line 25, to coil 47, a normally closed switch 54, contacts 50 and supply line 24.

The circuit for the phonograph motor 40 is traced as follows: starting with line 25, to motor 40, contact 45, switch blade 42, switch 54, contacts 50 and supply line 24.

The circuit for the safety-timer motor 48 is traced as follows: starting with line 25, motor 48, switch 54, contacts 50, and supply line 24.

Simultaneously with the above action of switch blade 42, the second switch blade 43 is actuated by the retractable pin 41 of the phonograph 1. Normally the switch blade 43 engages a contact 55. As the retractable pin 41 moves downwardly, the switch blade 43 disengages contact 55 and engages a contact 56.

The switch blade 43 and contact 56 are connected in circuit such that when they are engaged a lifter motor 57 is energized through the following circuit: starting with line 25, to motor 57, switch blade 43, contact 56, switch 54, contacts 50 and supply line 24.

Figure 2:
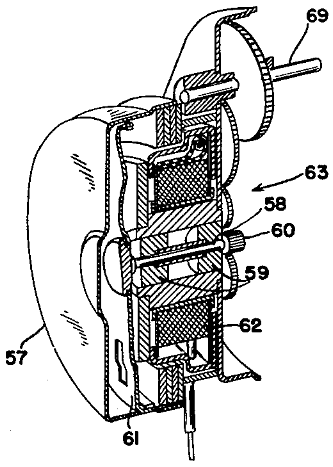
Fig. 2 is a perspective sectional view taken on line 2—2 of the motor shown in Figure 1.

The motor 57 is a synchronous motor having a magnetically operated gear shift such as disclosed in U. S. Patent No. 2,334,040, dated November 9, 1943. As more clearly shown in Figs. 2 and 3, the drive shaft 58 of the motor 57 is slidably journaled in a pair of bearings 59 and carries a small drive gear 60 secured at one end and a disc rotor 61 secured at the opposite end. The field winding 62 is disposed about the bearings 59 and between the drive gear 60 and the rotor 61. When the field winding 62 is energized, the rotor 61 is magnetically attracted and shifts the drive gear 60 outwardly into engagement with a suitable speed reduction gear train 63 against the bias of a spring loaded lever 64.

Figure 4:
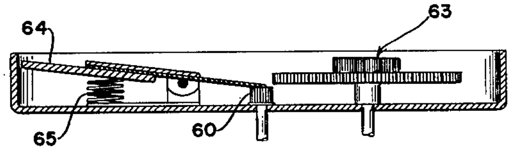
Fig. 4 is an enlarged view taken on line 4—4 of Fig. 3.

As more clearly shown in Fig. 4, the lever 64 is centrally pivoted with a compressed coil spring 65 disposed between the gear train housing and an end of the lever 64 to bias the opposite end of the lever 64 against the end surface of gear 60. The coil spring 65 acting through lever 64 holds the connected gear 60, shaft 58 and rotor 61 such that gear 60 and gear train 63 are disengaged. When the motor 57 is energized, the magnetic field set up by the winding 62 exerts an attractive force on the rotor 61 which overcomes the force of the spring 65 and axially moves the gear 60 into engagement with the gear train 63.

Figure 5:
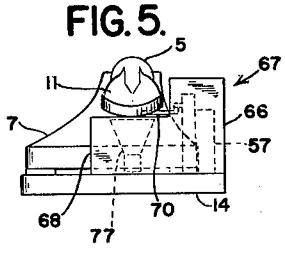
Fig. 5 is another view of the telephone illustrated in Figure 1.

As shown in Figs. 1, 5 and 6, the motor 57 is housed in the vertical leg 66 of an L-shaped housing 67 which is secured to the plate 14. The horizontal leg 68 of the housing 67 extends beneath the transmitting end 11 of the handset 6 and the vertical leg 66 extends upwardly behind the transmitting end 11.

An output shaft 69 of the gear train 63 drives an L-shaped lever 70, one leg of which extends beneath transmitter 11 of the handset 6 from a slot opening 71 in the vertical leg 66 of the housing 67. To release the buttons 9 of the telephone 3 and close the talking circuit of the telephone 3, the lever 70 pivots the handset 6 upwardly about a plate 72 extending from bracket 15 as seen in Figs. 1 and 5. The plate 72 is disposed immediately beneath the receiver 12 to provide a pivot point for the handset 6.

Figure 3:
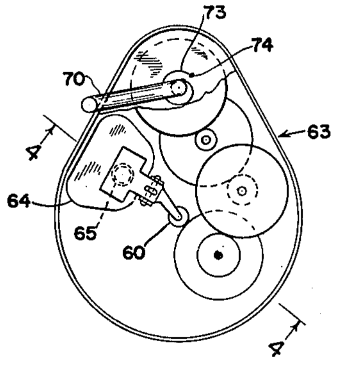
Fig. 3 is an elevational view of the motor gearing.

To reduce the load on the lever 70, a coil spring 73 is coiled around the output shaft 69 and connected at its respective ends to a binding post 74 on the motor and to the lever 70 as shown in Fig. 3. The coil spring 73 is wound up when the lever 70 is in its lowermost position with the handset 6 resting on the base 7 and in tending to unwind to a normal expanded position biases the lever 70 against the weight of the handset 6.

When the lever 70 engages the end of the slot 71, the motor 57 stalls, holding the handset in a raised position, shown by the dotted outline in Fig. 1. As subsequently described, the stalling of motor 57 is only for the period of an outgoing message which is normally insufficient to result in damage to the motor.

With the buttons 9 in a released position, the telephone circuit is closed and messages are transmitted and received.

Figure 7:
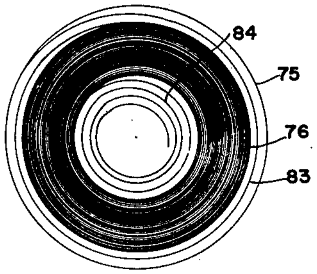
Fig. 7 is an elevational view of an outgoing message record.

To transmit a message to a calling party, a record 75 is carried by the turntable 46 and has a previously cut outgoing message portion 76 as shown in Fig. 7. The message is transmitted to the calling party by a speaker 77 acoustically coupled with the transmitter 11 of the handset 6 as shown in Figs. 1, 5 and 6. The speaker 77 is mounted within the horizontal leg 68 of housing 67 with the speaker cone immediately adjacent the transmitter 11. To facilitate transmission of sound from the speaker 77 to the calling party, an opening 78 is provided in the housing adjacent the transmitter 11.

A tone arm 79 carries a phonograph pickup 80 which moves across the record 75 and transmits the message to the speaker 77 via the electronic tubes 19 and 20. The outgoing message is amplified by the electronic tubes and fed to the speaker 77 from the tube 20 via contacts 52, a set of normally closed contacts 81 and a conductor 82.

To delay the outgoing message until the talking circuit buttons 9 are sufficiently released to close the telephone talking circuit, a starting groove 83 is provided on the record 75 in the conventional manner.

Immediately following the outgoing message portion 76, a conventional throw-out groove 84 is provided to carry the pickup 80 and the tone arm 79 to the center of the record. The movement of the tone arm 79 to the center of the record operates the automatic reject mechanism (not shown) and the retractable pin 41 is elevated to its normally inoperative position, as more fully described in the previously referred-to patent.

With the elevation of pin 41 the switch blade 42 disengages the contact 45 and engages the contact 44. Simultaneously, the switch blade 43 disengages contact 56 and engages contact 55.

When switch blade 43 disengages contact 56 the alternating current power circuit for the lifter motor 57 is broken. Immediately thereafter the switch blade 43 engages contact 55 to complete a direct current power circuit for the motor 57. The direct current power supply is shown for purposes of illustration as comprising a rectifier 85 connected in circuit with power supply lines 24 and 25 and connected in series with the motor 57 as follows: line 25 to conductors 86 and 87, field winding 62 of motor 57, switch blade 43, contact 55, rectifier 85, timer switch 54, contacts 50 and supply line 24.

The direct current energizes the winding 62 of motor 57 and sets up a magnetic field which holds drive gear 60 engaged with the gear train 63. The magnetic D. C. field is stationary and therefore does not exert a turning force on the rotor 61, although the field does exert a sidewise force on the rotor 61 and thereby holds the gear 60 engaged with gear train 63. In the above position, the handset 6 is biased due to gravity to a lowered position; i. e. resting on the base 7 with an opening of the talking circuit. The return of the handset 6 to the base 7 at this time is prevented by the engagement of gear 60 and gear train 63 which exerts a sufficient friction or retarding force to prevent the lowering of the handset and also the spring 73 which biases the lifting lever 70 against the weight of the handset 6. Therefore, the talking circuit remains closed until the motor circuit traced above is broken. Incoming messages are recorded, as subsequently described, without a distorting magnetic flux arising from the motor 57.

The disengagement of switch blade 42 and contact 45 opens the power circuit of the phonograph motor 40 and the phonograph 1 returns to standby condition. As the contacts 50 form a by-pass around switch blade 42 and contact 45 with respect to the latching coil 47 and the safety timer motor 48, they remain energized even though their initial energization is partially dependent on the closing of the now open switch blade 42 and contact 45.

The traveling of switch blade 42 into engagement with contact 44 connects a relay coil 88 and wire recorder motor 89 in parallel circuit across the supply lines 24 and 25 as follows: starting with supply line 25, either relay coil 88 or motor 89 to a common terminal 90, and then conductor 91 to contact 44, switch blade 42, switch 54, contacts 50, and to supply line 24.

The wire recorder motor 89 is adapted to drive a record wire or tape wound on two spaced spools 93 and 94 through an electromagnetic recording head 95 of the wire recorder 2.

The relay coil 88 actuates an armature 96 which, upon energization of the coil, operates to open contacts 81 and to close contacts 97 and 98. Contacts 81, as previously noted, are in the circuit connecting the phonograph pickup 80 to the speaker 77 and therefore when the contacts open, the speaker is disconnected.

The contacts 97 connect the power supply 22 to an oscillator 99 and also reconnect the power supply 22 to the electronic tube 18 via the contacts 51.

The oscillator 99 is connected to the usual erase coil 100 in the electromagnetic recording head 95. The oscillator 99 is of any conventional variety and is therefore shown in block form in the drawing.

When the contacts 98 close, a voice coil 101 of the wire record head 95 is connected in circuit with the induction coil 16. With the wire recorder motor 89 energized and B+ voltage supplied to the tube 18, an incoming message is picked up by the induction coil 16, amplified by tubes 18, 19 and 20 and then fed to the voice coil 101 of record head 95 via the contacts 52 of relay coil 47 and contacts 98 of relay coil 88.

The period allowed for recording an incoming message is determined by the period of a complete cycle less the period of the outgoing message record 75.

The period of a complete cycle is controlled by a cam 102 which is driven toward the switch 54 by safety-timer motor 48. After a predetermined period of time, the cam 102 engages and momentarily opens the switch 54 and thereby deenergizes the latching coil 47. When the coil 47 is de-energized, the contacts 50 open the power line 24 and return the entire apparatus to standby position.

A coil spring 103 is wound around the shaft 104 of the safety-timer motor 48 and returns the cam 102 to standby position. One end of the spring 103 is secured to the motor 48 and the opposite end is secured to the cam 102, biasing the cam 102 toward a stop 105.

The safety-timer motor 48 is adapted to drive a second cam 106 also attached to the shaft 104 which opens a safety switch 107 in the supply line 24 after a predetermined period of time longer than the normal cycle as determined by the cam 102. The safety switch 107 is of a manual reset variety. For purposes of illustration, the safety switch 107 is shown as having a stationary spring lock 108 which holds the switch open when the switch 107 is actuated by cam 106 and requires a manual resetting.

The operation of the telephone answering and message recording apparatus illustrated in the drawings is as follows:

Assume the apparatus is connected for automatic operation by closing of the master switch 5 and resultant energization of the power supply 22. The apparatus is then in standby condition with B+ voltage supplied to tubes 18 through 21.

The ringing current signal of an incoming call sets up a magnetic field and originates an induced current in the induction coil 16. The current is amplified by the amplifier 4 and then energizes the relay coil 38 which closes the contacts 39 during each incoming ringing signal.

The closing of contacts 39 completes the energization circuit for the phonograph motor 40 and causes the motor to run for the duration of each signal. After several ringing signals, the retractable pin 41 is depressed and switch blade 42 engages cotact 45 and switch blade 43 engages contact 56.

The engaging of switch blade 42 and contact 45 completes a circuit across the supply lines 24 and 25 for the safety-timer motor 48 and the relay coil 47.

The safety-timer motor 48 rotates the cams 102 and 106 to allow a predetermined cycle of operation after which the apparatus is automatically disconnected and returned to standby condition.

The relay coil 47 closes the contacts 50 and thereby completes a bypass around the contacts 39 and also completes an energization circuit for the relay coil 47 and safety-timer motor 48 which is independent of the switch blade 42 and its associated contacts 44 and 45.

The relay coil 47 also opens contacts 31 to remove B+ voltage from the plate circuit of the tube 18 and thus prevent voltages induced in the coil 16 from being inserted into the circuit. The contacts 51 are closed by relay coil 47 to permit reactivation of tube 18 in the recording circuit, as hereinafter described.

At the same time, relay coil 47 closes the contacts 52 to connect the phonograph pickup 81 to the speaker 77 and opens contacts 53 to disconnect the tube 21 and consequently the triggering relay coil 38 from the circuit.

The phonograph 1 runs its cycle, with the tone arm 79 and pickup 80 moves slowly toward the center of the record. The outgoing message is fed from the record 75 by the pickup 80 to the speaker 77 via the amplifier tubes 19 and 20.

Simultaneously with the movement of switch blade 42, the switch blade 43 engages contact 56 and places the lifter motor 57 across the supply lines 24 and 25. The lifter motor 57 drives the L-shaped lever 70 which pivots the handset 6 upwardly, releasing the talking circuit buttons 9 and thereby simulates the answering of the telephone.

The outgoing message is transmitted from the speaker 77, by the adjacent transmitter 11 of the handset 6, to the calling party.

Upon completion of the outgoing message, the tone arm 79 and phonograph pickup 80 move to the center of the record 75 which causes retraction of the pin 41 described in the patent previously referred to.

Retraction of pin 41 permits the switch blades 42 and 43 to return to normal position, engaged with contacts 44 and 55 respectively.

The movement of switch blade 43 disconnects the lifter motor 57 from the alternating current energization circuit and connects it to the direct current energization circuit, previously set forth. Therefore, although the lifter motor 57 magnetically holds in the gear train to prevent return of the handset 6 to the base 7, the motor discontinues rotation since alternating current is required to maintain rotation.

The movement of switch blades 42 disconnects the phonograph motor 40 to discontinue operation of the phonograph 1 and connects the wire recorder motor 89 and relay coil 88 across the supply lines 24 and 25.

The wire recorder motor 89 operates to wind the record tape 92 from the spool 93 to the spool 94 with the record tape traveling through the record head 95. As the tape 92 passes through the record head 95, the erase coil 100 cleans the tape and the voice coil 101 records an incoming message on the tape as follows:

The relay coil 88 which is energized when the phonograph 1 automatically rejects, opens the contacts 82 to disconnect the speaker 77 from the tube 20 and closes the contacts 98 to connect the voice coil 101 in circuit with the induction coil 16 and the amplifier tubes 18, 19 and 20. Simultaneously, the relay coil 88 closes the contacts 97 to reinsert B+ voltage in the plate circuit of tube 18 via contacts 51 and to place B+ voltage in the plate circuit of the oscillator 99.

Therefore, with the wire recorder motor 89 drawing the record tape 92 through the recording head 95, an incoming message is induced into the coil 16, amplified in tubes 18, 19 and 20 and then recorded on record tape 92. The recording of incoming messages occurs during the period of a cycle after the phonograph 1 automatically rejects and continues until the cam 102 opens the switch 54.

When the switch 54 opens, as a result of engagement by cam 102, the energization circuit for latching coil 47 is momentarily opened with a resultant opening of the bypass contacts 50, and de-energization of the apparatus. The current is released from the lifter motor 57, and the magnetic clutch assembly releases, allowing the handset 6 to return to the base 7 and open the talking circuit of the telephone. The opening of contacts 50 opens the energization circuit for timer motor 48 and the cam 102 is returned to standby position engaging the stop 105 by the spring 103.

In the event of defective operation whereby the apparatus continues operation after the cam 102 engages switch 54, the safety-timer motor 48 drives the second cam 106 sufficiently to open the safety switch 107. The safety switch 107 opens the main power line 24 and insures stoppage of the apparatus. As switch 107 is a manual reset type, the defective apparatus is inoperative and interference with the telephone system is prevented.

With suitable manual switches inserted in the circuit, the subscriber may effect a rewinding of the record tape carrying the recorded incoming messages and a reproduction of the messages thereon, as in the usual wire or tape recorder.

The disclosed holding apparatus is also particularly adapted for systems wherein a motor driven member is to be quickly stopped. For example, a television antenna rotating motor where it is desired to change the position of television antenna to improve signal reception. Generally, the inertia of the rotating antenna prevents accurate stoppage without complicated auxiliary apparatus. When the direct current is applied to the motor in the present invention, the clutch connecting the motor and the antenna or other load is maintained engaged and overcomes the inertia of the antenna.

Various modes of carrying out the invention may be employed within the scope of the accompanying claims which particularly point out and distinctly set forth the subject matter regarded as the invention.

I claim:

1. In a timing and holding control apparatus, a driven member, means biasing said driven member to an initial position, an alternating current motor, a source of alternating current connected in an energization circuit with said motor, a magnetic clutch connecting said motor and said driven member to effect movement of said driven member against said biasing means, said magnetic clutch being energized by a current flow in said motor, a direct current source connected in an energization circuit with said motor, and a timer switch adapted to disconnect said alternating current from said motor and to connect said direct current source to said motor after a predetermined period of operation of the motor and thereby hold said driven member in position against said biasing means.

2. In a timing and holding control apparatus, an alternating current motor, an alternating current source connected in an alternating current energization circuit with the motor, a driven member, a magnetic clutch connecting said driven member to said motor and being operably associated with the magnetic field of said motor to effect an operable drive connection between said driven member and said motor, means biasing said driven member to an initial position, a rectifier connected in circuit with said alternating current source to provide a source of direct current, and switch means to disconnect said motor from said alternating current energization circuit and to connect said motor to the source of direct current whereby said driven member is held in position against the biasing means.

3. In a timing and holding control apparatus, an alternating current motor having an output shaft connected to a disc rotor, said rotor and output shaft having a limited shaftwise movement, resilient means biasing said rotor and shaft to an initial position, a drive shaft, a gear train connecting said drive shaft and said output shaft, said gear train being disengaged with said output shaft in an initial position, means biasing said drive shaft to an initial position, said rotor being moved against said resilient means by the magnetic field arising from the field winding of said motor to effect engagement of the gear train, the friction of the gear train preventing return of the drive shaft to an initial position by the biasing means, a source of alternating current, a source of direct current, switch means connected with said source of alternating current and said source of direct current and the field winding of said motor to effect the selective energization of said field winding with alternating current and direct current whereby said drive shaft is moved a predetermined quantity by alternating current energization of the field winding and held in that position by direct current energization of the field winding.

4. In an automatic telephone answering device, a reproducer operably associated with a telephone to transmit a previously recorded message over the telephone, a motor normally energized from an alternating current source, switch actuating means adapted to close the talking circuit of said telephone, a magnetic clutch connecting said motor and said switch actuating means, said clutch being controlled by energization of the motor, electromagnetic means responsive to an incoming telephone signal and being connected in circuit with said reproducer and said motor to actuate the same upon receipt of a signal, a source of direct current, and a timed switch adapted after a predetermined period of reproducer operation to simultaneously remove the alternating current from the motor and connect the direct current to the motor and thereby hold in said magnetic clutch while preventing operation of the motor.

5. In an automatic telephone answering and message recording apparatus, a reproducer operably associated with a telephone to transmit a previously recorded message over the telephone, a motor normally energized by an alternating current source, switch actuating means adapted to close the talking circuit of said motor, a magnetic clutch disposed adjacent said motor and regulated by the magnetic field arising from energization of the motor, said magnetic clutch connecting said motor and said switch actuating means, electromagnetic means responsive to an incoming ringing signal and being connected in circuit with said reproducer and said motor to actuate the same upon receipt of a signal, recording means operably associated with said telephone to record an incoming message received thereover, a source of direct current, switch means connected in the energization circuit of the motor and adapted to simultaneously disconnect the motor from the alternating current source and connect the motor to the direct current source, and timing means operably associated with said switch means to connect the direct current to said motor prior to the recording of an incoming message.

6. In an automatic telephone answering and message recording apparatus, a reproducer operably associated with a telephone to transmit a previously recorded message over the telephone, electromagnetic means responsive to an incoming signal and connected in circuit with said reproducer to actuate the same upon receipt of the incoming signal, an alternating current motor having an energization circuit including a source of alternating current and a source of direct current, a magnetic clutch attached to said motor and pulled in by a magnetic field set up by energization current of said motor, an actuating member coupled with said clutch to close the talking circuit of the telephone in response to operation of the motor, switch means in the energization circuit of the motor to selectively provide alternating current and direct current to the motor, switch actuating means operably associated with the switch means and operated by said reproducer to first connect alternating current to said motor and after a predetermined period of operation the reproducer to disconnect the alternating current from the motor and to connect the direct current to the motor, a recorder operably associated with said telephone to record an incoming message, an energization circuit for said recorder, switch means connected in the recorder energization circuit and controlled by the operation of said reproducer, and the switch means being actuated to effect energization of the recorder simultaneously with the placement of direct current on said motor.

7. In an automatic telephone answering and message recording apparatus, a reproducer operably with a telephone to transmit a previously recorded message over the telephone, a recorder operably associated with the telephone to record an incoming message, electromagnetic means connected in the power circuit of said reproducer and responsive to an incoming ringing signal to start said reproducer, a lifter operably associated with the telephone switching means to close the talking circuit of the telephone, an alternating current motor having a disc rotor and an output shaft movable in a shaftwise direction, means biasing said rotor and shaft to an initial position, said rotor being attracted against said biasing means by the magnetic field of the motor field winding to move said rotor and shaft against said biasing means, a gear train connecting said lifter and said output shaft and being in engagement with said shaft with the shaft in outer position and being in disengagement with said shaft with the shaft in the initial position, a source of alternating current, a source of direct current, switch means connected in circuit with the source of alternating current and with the source of direct current and with the field winding of the motor to selectively energize the field winding with alternating current and direct current, and a switch actuator connected to said reproducer and said switch means to connect said motor to said alternating current source during the transmission of a previously recorded message and to connect the motor to the direct current source during the recordation of an incoming message.

8. In an automatic telephone answering and message recording apparatus, a reproducer operably associated with a desk telephone to transmit a previously recorded message over the telephone, said reproducer returning to standby position after transmission of the outgoing message, a recorder inductively associated with the telephone to record an incoming message, a lever extending beneath the handset of the telephone, an alternating current motor having an output shaft connected to said lever to effect a lifting of the handset from the telephone and thereby close the talking circuit of the telephone, a gear train connecting the lever and the output shaft, a disc rotor securely attached to said output shaft and being transversely moved by the magnetic field of the motor field winding whereby said output shaft completes the gear train to said lever in the presence of the magnetic field, a spring operably associated with said output shaft to bias the output shaft against said movement and thereby break the gear train in the absence of the magnetic field, an alternating current source, a direct current source, switch means to selectively connect the field winding of the motor in circuit with the alternating current source and the direct current source, and a switch actuator operated by said reproducer to actuate said switch means and first connect the alternating current source to the motor to lift the handset of the telephone and then connect the direct current source to the motor to hold the handset in position during the recording of an incoming message.

9. In an automatic telephone answering and message recording apparatus, a reproducer operably associated with a telephone to transmit a previously recorded message over the telephone, the telephone having a base and a handset carrying the transmitter and the receiver, a recorder inductively associated with said telephone to record an incoming message, a lever extending beneath the transmitter of the handset and being held in an initial position by the weight of the telephone handset resting on the telephone base, a plate extending beneath the receiver to provide a pivot point about which the handset pivots upwardly, an alternating current motor having an output shaft geared to said lever to move the lever upwardly and pivot the handset about the plate, said output shaft being movable in a shaftwise direction and carrying a gear of the gear train, resilient means biasing said shaft to an initial position with the gear train disengaged, the rotor of the motor being securely attached to the output shaft and being moved in a shaftwise direction by the magnetic field of the motor field winding against the bias of the resilient means, a source of alternating current to cause said motor to move said lever, a source of direct current to hold said gear train engaged and prevent return of the lever to the initial position, switch means selectively connecting the motor to the source of alternating current and the source of direct current, a switch actuator operated by the reproducer to connect the motor to the source of alternating current during the transmission of the outgoing message and to the source of direct current during the recording of the incoming message, and means biasing said lever against the weight of said handset to decrease the required output of the motor and to partially overcome the biasing effect of the handset on said lever whereby the friction of the gear train positively prevents return of the handset when the motor field is energized by a direct current.

10. In a combined moving and holding apparatus, a driven member, an alternating current motor, a source of alternating current adapted to be connected in an energization circuit with said motor, a magnetic clutch connecting said motor and said driven member to effect a movement of the driven member, said magnetic clutch being energized by a current flow in said motor, a direct current source adapted to be connected in an energization circuit with said motor, and switch means adapted to selectively control the connection of the motor to said source of alternating current and to said source of direct current, said motor driving said driven member when excited from said alternating current source and said motor quickly stopping and holding said driven member when excited from said direct current source.

References Cited in the file of this patent

UNITED STATES PATENTS

| | | |
|---|---|---|
| 2,334,040 | Schellens | Nov. 9, 1943 |
| 2,384,775 | Stenhammer | Sept. 11, 1945 |
| 2,539,139 | Jordanoff | Jan. 23, 1951 |